UNITED STATES PATENT OFFICE.

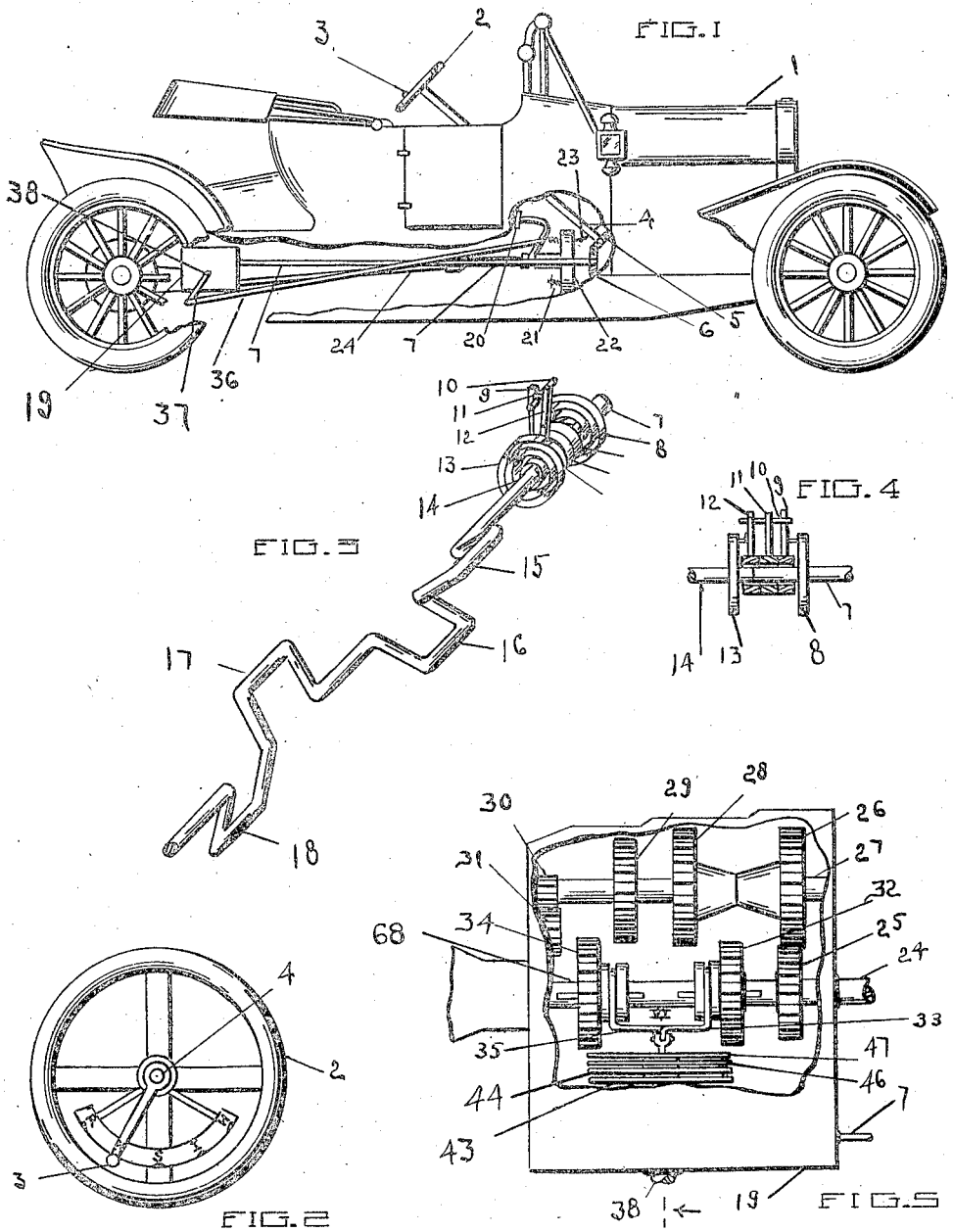

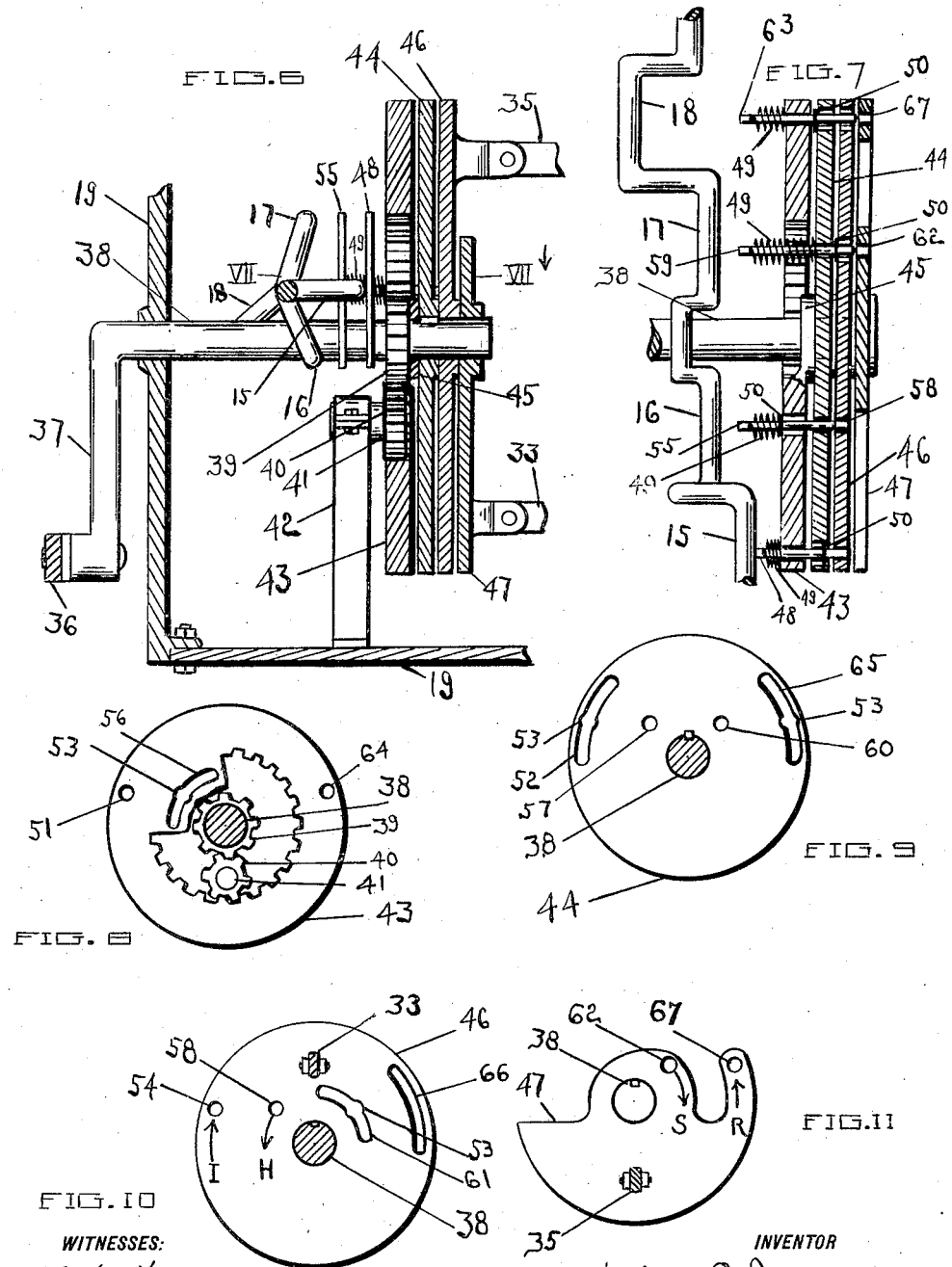

HUBERT A. MYERS, OF TOLEDO, OHIO, ASSIGNOR OF ONE-HALF TO ALBERT A. ATWOOD, OF TOLEDO, OHIO.

GEAR-SHIFTING MECHANISM.

1,102,787.   Specification of Letters Patent.   Patented July 7, 1914.

Application filed December 8, 1913. Serial No. 805,281.

*To all whom it may concern:*

Be it known that I, HUBERT A. MYERS, a citizen of the United States of America, residing at Toledo, Lucas county, Ohio, have invented a new and useful Gear-Shifting Mechanism, of which the following is a specification.

This invention relates to features of simplicity of control between driving and driven members having a plurality of driving relations.

This invention has utility when embodied in connection with variable speed driving mechanisms, as in motor vehicles.

Referring to the drawings: Figure 1 is a side elevation, with parts broken away, of an embodiment of the invention in a motor vehicle; Fig. 2 is a plan view of the steering wheel; Fig. 3 is a perspective view of the cranked shaft and yieldable actuating connection therefor, of the selector; Fig. 4 is a side elevation, with the sleeves in section, of the yieldable actuating connection of the selector; Fig. 5 is a plan view, with parts broken away, of the variable speed drive or transmission, and features of control therefor; Fig. 6 is a section on an enlarged scale, on the line VI—VI, Fig. 5, looking in the direction of the arrow; Fig. 7 is a section on the line VII—VII, Fig. 6, looking in the direction of the arrow; Fig. 8 is an elevation, looking from the right in Fig. 6 of the first actuator disk; Fig. 9 is an elevation of the second actuator disk; Fig. 10 is an elevation of the first shifting disk; and Fig. 11 is an elevation of the second shifting disk.

The motor vehicle 1 is provided with the steering wheel 2 in which is mounted the selector arm 3 mounted on the shaft 4 (Figs. 1, 2) carrying the bevel gear 5 in mesh with the bevel gear 6 on the selector shaft 7. Fixed to the selector shaft 7 is the spiral spring 8 having its outer end fast to the arm 9 loosely sleeved on the shaft 7. This spring 8 holds the arm 9 against the pin 10 carried by the loose arm 11, the opposite end of the pin 10 having its other side abutted by the arm 12 held thereagainst by the spring 13, similar to the spring 8 but oppositely coiled and having its inner end fast to the shaft 14 in alinement with the shaft 7. The three loose arms with the two springs form a yielding connection tending to maintain the shafts 7 and 14 in similar angular position, but permitting relative movement therebetween when resistance is interposed. Upon release of such resistance the shafts at once assume their normal angular relation (Figs. 3, 4).

The shaft 7 has formed therein the crank arms 15, 16, 17, 18, equally disposed in about fifth relations, except that the spacing between the arms 17, 18, is double and corresponding to the "N" position of the arm 3, indicating disconnected or neutral setting of the mechanism. The shaft 7 with its yieldable connection and cranks is disposed in the transmission housing 19.

For directly controlling the driving, the pedal or foot lever 20 when thrust forward against the resistance of the springs 21 releases the clutch 22 from driving by the motor 23 the main drive shaft 24 extending to the transmission housing 19 (Figs. 1, 5). This shaft 24 has fast thereon the gear 25 in mesh with the gear 26 on the parallel countershaft 27. Fast on the shaft 27 are the gears 28, 29, and 30, the latter being in mesh with the intermediate gear 31. Shifting of the gear 32 by the arm 33 toward the gear 25 clutches up for direct driving at high speed forward from the shaft 24. Opposite shifting brings the gear 32 in mesh with the gear 28 for intermediate or second speed forward. Shifting of the gear 34 into mesh with the gear 29 is the connection for slow speed forward, while opposite shifting of the gear 34 as brought about by the arm 35, connects up through the gear 31 for reverse or backward driving.

In the thrusting forward of the foot lever 20, the link 36 connected thereto, rocks the crank 37 of the shaft 38 in the housing 19. Fast to the shaft 38 is the pinion 39 in mesh with the pinion 40 on the shaft 41 carried by the bearing bracket 42 in the housing 19. This pinion 41 serves to oscillate the first actuator member or disk 43 in a direction opposite to the travel of the shaft 38 which has fast thereon the second actuator disk 44, adjacent the disk 43, and accordingly simultaneously oppositely oscillated. The bearing 45 serves to position the disk 43, by loosely engaging the shaft 38 between the pinion 39 and the disk 44.

Loosely mounted on the shaft 38 adjacent each other and the actuator disks 43, 44, are the shifting disks 46, 47, respectively connected to the shifting arms 33, 35 (Fig. 6).

The selector determines the connection for the driving relation by the position of the crank arms. In Fig. 7 the crank arm 15 is shown as forcing the plunger 48 against the resistance of the spring 49 into connecting position. The plunger 48 carries the disk or collar 50. The plunger is mounted in the hole 51 of the first actuator member 43 (Fig. 8), passes through the slot 52 in the second actuator member 44 (Fig. 9). The enlargement 53 in the slot 52 permits thrusting of the plunger 48 into driving relation in the hole 54 of the shifting member 46 (Fig. 10) only when the disks are oscillated into neutral disconnected position. Similarly, the relative travel of the disks 43, 44, takes the collar 50 out of alinement or registering position with the enlargement 53 and therefore holds the plunger locked in connecting or disconnecting position as controlled initially by the crank arm 15. The arm 15 accordingly connects the member 46 to actuate the arm 33 for a driving connection in intermediate speed position, as the springs 21 cause the pedal 20 to recover. The shifting accordingly occurs during disconnection of the clutch 22, and requires no special manipulation by the driver, other than the preliminary selection which may occur at any time independently of the actual shifting.

The crank 16 controls the connecting plunger 55, normally held in disconnecting position by its spring 49. Its initial position of disconnection or throw is determined by its disk 50 riding out of registry with the opening 53 in the slot 56. This plunger 55 is driven by its hole connection 57 with the second actuator 44, and transmits this actuation by engaging the hole 58 in the oscillating shifting member 46, thus connecting up for high speed position of transmission.

The crank 17 forces the plunger 59 against its spring 49. This plunger has driving connection at the hole 60 with the second actuator 44 and may reciprocate as its collar 50 registers with the enlargement 53 in the slot 61 of the shifting member 46. Driving engagement is made with the second shifting member 47 by the plunger 59 entering the hole 62, serving to shift the parts for slow speed forward connecting position of the variable speed mechanism.

The crank 18 controls the reciprocations of the plunger 63 normally maintained in disconnecting position by its spring 49. This plunger has driving engagement by its mounting in the hole 64 of the first actuator disk 43. Its throw is limited to neutral or disconnected position of the disks by its collar 50 registering with the enlargement 53 in the slot 65 in the second actuator 44.

This plunger 63 passes freely through the slot 66 in the first shifting member 46 to engage in the opening 67 of the second shifting member 47, serving to connect the mechanism for driving in reverse or backward direction. These driving connections control the direction and speed of rotation of the shaft 68.

While the yielding connection is shown for the selector, in the disclosure herein, the spring release of the connecting plungers independently of the position of the cam throw of the setting crank for the particular connection, does not necessitate the yielding action of the selector except for the setting in the next position. The lock release positions of the disconnected plungers hold the crank shaft from complete shifting to a selection. The throw of the pedal 20 brings all of the mechanism into disconnecting position, when the selector may complete its selected throw, effecting the desired connecting of the shifting members, so that on the recover travel of the pedal 20 the transmission is connected just before the clutch 22 is connected for driving.

What is claimed and it is desired to secure by Letters Patent is:

1. A driving member, a driven member, mechanism for establishing a plurality of driving relations therebetween including a multiple cranked selector embodying a plurality of rigidly connected independently active cranks, and actuating means controlled by the selector.

2. A driving member, a driven member, mechanism for establishing a plurality of driving relations therebetween including a selector embodying a rotatable shaft provided with a crank for each driving relation, and actuating means controlled by the selector.

3. A driving member, a driven member, mechanism for establishing a plurality of driving relations therebetween including a selector embodying a plurality of reciprocable plungers, and actuating means controlled by the selector embodying pairs of members connected by the plungers.

4. A driving member, a driven member, mechanism for establishing a plurality of driving relations therebetween including a selector embodying a cranked shaft, plungers disposed to be thrown by cranked shaft rotation, and actuating means controlled by the selector.

5. A driving member, a driven member, mechanism for establishing a plurality of driving relations therebetween including a selector embodying a cranked shaft, a plunger for each driving relation disposed to be thrown by cranked shaft rotation, and actuating means controlled by the selector.

6. A driving member, a driven member, mechanism for establishing a plurality of driving relations therebetween including a selector, and means controlled by the selector embodying oppositely oscillating actuator members laterally adjacent.

7. A driving member, a driven member, mechanism for establishing a plurality of driving relations therebetween including a selector, and means controlled by the selector embodying oppositely movable actuator members, and laterally adjacent oscillating members connectible thereto.

8. A driving member, a driven member, mechanism for establishing a plurality of driving relations therebetween including a selector, and means controlled by the selector embodying a pair of oppositely oscillating actuator disks, and a pair of laterally adjacent disks connectible thereto.

9. A driving member, a driven member, mechanism for establishing a plurality of driving relations therebetween including a selector, and means controlled by the selector embodying coaxial actuators and members connectible thereto.

10. A driving member, a driven member, mechanism for establishing a plurality of driving relations therebetween including oppositely oscillating actuator members, adjacent disks, and a selector for connecting the members and disks.

11. A driving member, a driven member, mechanism for establishing a plurality of driving relations therebetween including oppositely oscillating actuator members, connectible members, and a selector embodying a cranked shaft having means to connect the actuator members to drive the connectible members.

12. A driving member, a driven member, mechanism for establishing a plurality of driving relations therebetween including oppositely oscillating actuator members, connectible members, and a selector embodying a cranked shaft and plungers on the shaft positively controlled by the shaft to connect the actuator members with the connectible members.

In witness whereof I affix my signature in the presence of two witnesses.

HUBERT A. MYERS.

Witnesses:
C. H. RAUCH,
GEO. E. KIRK.

---

Copies of this patent may be obtained for five cents each, by addressing the "Commissioner of Patents, Washington, D. C."